United States Patent
Kuriyama et al.

(10) Patent No.: US 10,316,251 B2
(45) Date of Patent: *Jun. 11, 2019

(54) NEMATIC LIQUID CRYSTAL COMPOSITION AND LIQUID CRYSTAL DISPLAY DEVICE USING SAME

(71) Applicant: DIC CORPORATION, Tokyo (JP)

(72) Inventors: Takeshi Kuriyama, Kita-adachi-gun (JP); Joji Kawamura, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,744

(22) Filed: Aug. 22, 2017

(65) Prior Publication Data

US 2017/0349829 A1 Dec. 7, 2017

Related U.S. Application Data

(62) Division of application No. 14/773,067, filed as application No. PCT/JP2013/079561 on Oct. 31, 2013, now Pat. No. 9,745,513.

(30) Foreign Application Priority Data

Mar. 6, 2013 (JP) ................................. 2013-043988

(51) Int. Cl.
| | |
|---|---|
| *G02F 1/1333* | (2006.01) |
| *C09K 19/30* | (2006.01) |
| *C09K 19/54* | (2006.01) |
| *C09K 19/32* | (2006.01) |
| *C09K 19/44* | (2006.01) |
| *G02F 1/1343* | (2006.01) |
| *G02F 1/1368* | (2006.01) |
| *C09K 19/04* | (2006.01) |
| *C09K 19/12* | (2006.01) |
| *G02F 1/00* | (2006.01) |

(52) U.S. Cl.
CPC ........ *C09K 19/3003* (2013.01); *C09K 19/322* (2013.01); *C09K 19/44* (2013.01); *C09K 19/54* (2013.01); *C09K 19/542* (2013.01); *G02F 1/1368* (2013.01); *G02F 1/13439* (2013.01); C09K 2019/0448 (2013.01); C09K 2019/122 (2013.01); C09K 2019/123 (2013.01); C09K 2019/301 (2013.01); C09K 2019/3004 (2013.01); C09K 2019/3009 (2013.01); C09K 2019/3016 (2013.01); C09K 2019/3025 (2013.01); C09K 2019/3027 (2013.01); C09K 2019/548 (2013.01); G02F 1/0045 (2013.01)

(58) Field of Classification Search
CPC .. C09K 19/3003; C09K 19/322; C09K 19/44; C09K 19/54; C09K 19/542; C09K 2019/0448; C09K 2019/122; C09K 2019/123; C09K 2019/3004; C09K 2019/3009; C09K 2019/301; C09K 2019/3016; C09K 2019/3025; C09K 2019/3027; C09K 2019/548; G02F 1/1333; G02F 1/13439; G02F 1/1368; G02F 1/0045

USPC ...................................................... 252/299.6
See application file for complete search history.

(56) References Cited

U.S. PATENT DOCUMENTS

| | | |
|---|---|---|
| 6,051,288 A | 4/2000 | Kondo et al. |
| 6,444,278 B1 | 9/2002 | Reiffenrath et al. |
| 6,896,939 B2 | 5/2005 | Klasen-Memmer et al. |
| 7,731,865 B2 | 6/2010 | Bernatz et al. |
| 7,872,719 B2 | 1/2011 | Hanaoka et al. |
| 8,399,073 B2 | 3/2013 | Klasen-Memmer et al. |
| 8,741,397 B2 | 6/2014 | Hattori et al. |
| 8,906,472 B2 * | 12/2014 | Kuriyama ............ C09K 19/062 252/299.5 |
| 8,999,460 B2 | 4/2015 | Goebel et al. |
| 9,005,720 B2 | 4/2015 | Goetz et al. |
| 9,411,207 B2 * | 8/2016 | Kuriyama .......... C09K 19/0403 |
| 9,745,513 B2 * | 8/2017 | Kuriyama .............. C09K 19/54 |
| 2003/0048401 A1 | 3/2003 | Hanaoka et al. |
| 2003/0197153 A1 | 10/2003 | Heckmeier et al. |
| 2003/0222245 A1 | 12/2003 | Klasen-Memmer et al. |
| 2004/0048401 A1 | 3/2004 | Hembree et al. |
| 2005/0146664 A1 | 7/2005 | Hanaoka et al. |

(Continued)

FOREIGN PATENT DOCUMENTS

| | | |
|---|---|---|
| CN | 1184462 A | 6/1998 |
| CN | 1412274 A | 4/2003 |

(Continued)

OTHER PUBLICATIONS

International Search Report dated Jan. 7, 2014, issued in application No. PCT/JP2013/079561.

(Continued)

*Primary Examiner* — Geraldina Visconti

(74) *Attorney, Agent, or Firm* — Westerman, Hattori, Daniels & Adrian, LLP

(57) ABSTRACT

A liquid crystal composition having negative dielectric anisotropy, large refractive index anisotropy, and low viscosity and containing as a first component, one or two or more compounds represented by general formula (I) and, as a second component, one or two or more compounds represented by general formula (II), wherein dielectric anisotropy (Δε) at 25° C. is −2.0 or less. Also, a liquid crystal display device having high contrast, fast response, and excellent display quality without causing image sticking and display defects.

8 Claims, No Drawings

(56) References Cited

U.S. PATENT DOCUMENTS

| | | |
|---|---|---|
| 2006/0011888 A1 | 1/2006 | Reiffenrath et al. |
| 2006/0182897 A1 | 8/2006 | Saito et al. |
| 2007/0007493 A1 | 1/2007 | Hattori et al. |
| 2007/0012898 A1 | 1/2007 | Saito et al. |
| 2008/0011984 A1 | 1/2008 | Fujita et al. |
| 2008/0075891 A1 | 3/2008 | Goto et al. |
| 2008/0121843 A1 | 5/2008 | Heckmeier et al. |
| 2009/0090892 A1 | 4/2009 | Fujita et al. |
| 2009/0103011 A1 | 4/2009 | Bernatz et al. |
| 2009/0206300 A1 | 8/2009 | Satou et al. |
| 2009/0242835 A1 | 10/2009 | Fujita et al. |
| 2009/0309066 A1 | 12/2009 | Klasen-Memmer et al. |
| 2009/0324853 A1 | 12/2009 | Bernatz et al. |
| 2010/0134751 A1 | 6/2010 | Klasen-Memmer et al. |
| 2010/0272925 A1 | 10/2010 | Goetz et al. |
| 2011/0063553 A1 | 3/2011 | Hanaoka et al. |
| 2011/0101270 A1 | 5/2011 | Manabe et al. |
| 2011/0248216 A1 | 10/2011 | Klasen-Memmer et al. |
| 2011/0255048 A1 | 10/2011 | Goetz et al. |
| 2011/0272631 A1 | 11/2011 | Saito |
| 2012/0229744 A1 | 9/2012 | Hattori et al. |
| 2012/0268706 A1 | 10/2012 | Goebel et al. |
| 2013/0027654 A1 | 1/2013 | Fujita et al. |
| 2014/0010973 A1 | 1/2014 | Gotoh et al. |
| 2014/0022473 A1 | 1/2014 | Goetz et al. |
| 2014/0027671 A1 | 1/2014 | Goto et al. |
| 2014/0183409 A1 | 7/2014 | Gotoh et al. |
| 2014/0226119 A1 | 8/2014 | Kuriyama et al. |
| 2015/0286081 A1 | 10/2015 | Kuriyama et al. |

FOREIGN PATENT DOCUMENTS

| | | |
|---|---|---|
| CN | 101356251 A | 1/2009 |
| CN | 101418220 A | 4/2009 |
| CN | 102015963 A | 4/2011 |
| DE | 10117224 A1 | 2/2002 |
| DE | 102008064171 A1 | 7/2010 |
| EP | 1970362 A1 | 9/2008 |
| JP | 06-235925 A | 8/1994 |
| JP | H6238925 A | 8/1994 |
| JP | 9-124529 A | 5/1997 |
| JP | H9124529 A | 5/1997 |
| JP | 2002-357830 A | 12/2002 |
| JP | 2003-327965 A | 11/2003 |
| JP | 2006-502205 A | 1/2006 |
| JP | 2006-169472 A | 6/2006 |
| JP | 2006-225450 A | 8/2006 |
| JP | 2007-023095 A | 2/2007 |
| JP | 2007-031694 A | 2/2007 |
| JP | 2007-246534 A | 9/2007 |
| JP | 2008-088164 A | 4/2008 |
| JP | 2008-285570 A | 11/2008 |
| JP | 2010-256904 A1 | 11/2010 |
| JP | 2014-043561 A | 3/2014 |
| JP | 2014-141648 A | 8/2014 |
| KR | 2010-0117030 A | 11/2010 |
| KR | 2012-0120992 A | 11/2012 |
| TW | 200718776 A | 5/2007 |
| TW | 200819520 A | 5/2008 |
| TW | 200927892 A | 7/2009 |
| TW | 200930797 A | 7/2009 |
| TW | 201031735 A | 9/2010 |
| TW | 201033337 A | 9/2010 |
| TW | 201033338 A | 9/2010 |
| TW | 201111482 A | 4/2011 |
| TW | 201124512 A | 7/2011 |
| TW | 201247625 A | 12/2012 |
| TW | I452119 B | 9/2014 |
| TW | I597352 B | 9/2017 |
| WO | 96/32365 A | 10/1996 |
| WO | 2007/077872 A1 | 7/2007 |
| WO | 2007/108307 A1 | 9/2007 |
| WO | 2011/055643 A1 | 5/2011 |
| WO | 2014/006963 A1 | 1/2014 |

OTHER PUBLICATIONS

Office Action dated Apr. 3, 2014, issued in Chinese Patent Application No. 201280003458.1.

Office Action dated Apr. 3, 2014, issued in Taiwanese Patent Application No. 101130192.

International Search Report of PCT/JP2012/070838 dated Oct. 2, 2012, with form PCT/ISA/220 and PCT/ISA/237, with partial English translation.

International Search Report dated Jan. 7, 2014, issued in application No. PCT/JP2013/080023.

Office Action dated Dec. 16, 2013, issued in corresponding Taiwanese application No. 101130192. (4 pages).

Office Action dated Feb. 25, 2015, issued in counterpart Korean application No. 10-2014-7026858, with English translation. (7 pages).

Office Action dated Dec. 21, 2017, issued in counterpart Japanese application No. 2014-041639, with English translation. (11 pages).

Office Action dated May 8, 2018, issued in counterpart Japanese application No. 2014-041639, with English translation. (8 pages).

Chen, Robert H., "Liquid Crystal Displays: Fundamental Physics and Technology", John Wiley & Soons, Inc., National Taiwan University, 2011, First Edition, 16 pages.

Office Action dated Oct. 29, 2018, issued in counterpart Korean Application No. 10-2015-7033720, with English translation (12 pages).

* cited by examiner

NEMATIC LIQUID CRYSTAL COMPOSITION AND LIQUID CRYSTAL DISPLAY DEVICE USING SAME

CROSS-REFERENCE TO RELATED APPLICATIONS

This application is a Divisional of U.S. patent application Ser. No. 14/773,067, filed on Sep. 4, 2015, which is a § 371 National Stage Application of PCT International Application No. PCT/JP2013/079561 filed on Oct. 31, 2013, which is based upon and claims the benefit of priority from the prior Japanese Patent Application No. 2013-043988, filed on Mar. 6, 2013, the entire contents of which are incorporated herein by reference.

TECHNICAL FIELD

The present invention relates to a nematic liquid crystal composition useful as a liquid crystal display material and exhibiting a negative value of dielectric anisotropy ($\Delta\varepsilon$), and also relates to a liquid crystal display device using the composition.

BACKGROUND ART

Liquid crystal display devices have been used for watches and electronic calculators, various measuring apparatuses, automotive panels, word processors, electronic notebooks, printers, computers, televisions, watches, advertising displays, etc. Typical examples of a liquid crystal display mode include a TN (twisted nematic) mode, a STN (super twisted nematic) mode, a VA (vertical alignment) mode using TFT (thin-film transistor), an IPS (in-plane switching) mode, and the like. Liquid crystal compositions used for these liquid crystal display devices are required to have stability to external stimuli such as moisture, air, heat, light, and the like, exhibit a liquid crystal phase within as wide a temperature range as possible including room temperature as a center, and have low viscosity and low drive voltage. Further, each of the liquid crystal compositions is composed of several types to several tens types of compounds in order to have optimum values of dielectric anisotropy ($\Delta\varepsilon$) and/or refractive index anisotropy ($\Delta n$) for a display device.

A vertical alignment-mode display uses a liquid crystal composition having negative $\Delta\varepsilon$ and is widely used for liquid crystal TV etc. On the other hand, low-voltage driving, fast response, and a wide operating temperature range are required for all driving methods. That is, a large absolute value of $\Delta\varepsilon$, low viscosity ($\eta$), and a high nematic-isotropic liquid phase transition temperature ($T_{ni}$) are required. Also, in view of setting of $\Delta n \times d$ which is the product of $\Delta n$ and a cell gap (d), it is necessary to adjust $\Delta n$ of a liquid crystal composition within a proper range according to the cell gap. In addition, when a liquid crystal display device is applied to a television or the like, fast response is regarded as important, and thus a liquid crystal composition having low $\gamma_1$ is required. In particular, the necessity to decrease viscosity and, at the same time, increase $\Delta n$ has recently arisen for decreasing a cell gap to achieve fast response. Therefore, Patent Literature 1 and Patent Literature 2 already disclose liquid crystal compositions using a compound having a fluorine-substituted ter-phenyl structure.

On the other hand, in order to practically use a liquid crystal composition for a liquid crystal display device, the liquid crystal composition is required to cause no defect in display quality. In particular, a liquid crystal composition used in an active matrix drive liquid crystal display device which is driven by TFT elements or the like is required to have high resistivity value or high voltage holding ratio. In addition, it becomes necessary to be stable for external stimuli such as light, heat, and the like. Accordingly, an antioxidant for improving stability for heat and a liquid crystal composition using the antioxidant are disclosed (refer to Patent Literature 3 and Patent Literature 4), but the stability is not necessarily satisfactory. In particular, liquid crystal compounds having large $\Delta n$ have relatively low stability for light and heat, and thus quality stability of compositions is not satisfactory.

Further, with expanding application of liquid crystal display devices, significant changes are found in use method and manufacturing method thereof. In order to cope with these changes, it is demanded to optimize characteristics other than basic physical property values which have been known. That is, VA (vertical alignment)-mode and IPS (in-plane switching)-mode liquid crystal display devices using liquid crystal compositions are widely used, and supersized liquid crystal devices of 50 inches or more are put into practical application. With increases in substrate size, instead of a usual vacuum injection method, a one drop fill (ODF) method becomes the mainstream of a method of injecting a liquid crystal composition into a substrate (refer to Patent Literature 5). However, when a liquid crystal composition is dropped on a substrate, the problem of degrading display quality by dropping marks is surfaced. Further, for the purpose of forming a pre-tilt angle of a liquid crystal material in a liquid crystal display device and of achieving fast response, a PS liquid crystal display device (polymer stabilized) and a PSA liquid crystal display device (polymer sustained alignment) are developed (refer to Patent Literature 6), but the problem of dropping marks becomes a larger problem. That is, these display devices are characterized by adding a monomer to a liquid crystal composition and curing the monomer in the composition, and, in many cases, the monomer is cured by irradiating the composition with ultraviolet light. Therefore, when a component having low stability for light is added, a decrease in resistivity value or voltage holding ratio is caused and, in some causes, the occurrence of dropping marks is induced at the same time, thereby causing the problem of degrading the yield of liquid crystal display devices due to display defects.

Accordingly, there is demand for development of a liquid crystal display device having high stability to light, heat, and the like and causing little display defects such as image sticking, dropping marks, and the like while maintaining the characteristics and performance, such as fast response and the like, which are required for liquid crystal display devices. There is also demand for development of a liquid crystal display device causing little display defects such as image sticking, dropping marks, and the like even in a vertical alignment-mode display in which alignment is controlled by a general vertical alignment film, not in a mode in which a polymer layer is formed in a liquid crystal layer formed by polymerizing a polymerizable compound.

CITATION LIST

Patent Literature

PTL 1: Japanese Unexamined Patent Application Publication No. 2003-327965

PTL 2: WO 2007/077872

PTL 3: Japanese Unexamined Patent Application Publication No. 9-124529

PTL 4: Japanese Unexamined Patent Application Publication No. 2006-169472
PTL 5: Japanese Unexamined Patent Application Publication No. 6-235925
PTL 6: Japanese Unexamined Patent Application Publication No. 2002-357830

SUMMARY OF INVENTION

Technical Problem

A problem to be solved by the invention is to provide a liquid crystal composition having negative $\Delta\varepsilon$, a liquid crystal phase over a wide temperature range, low viscosity, good solubility at a low temperature, high resistivity and voltage holding ratio, and stability to heat and light, and further provide, by using the liquid crystal composition, a VA-mode or PSVA-mode liquid crystal display device having good display quality and causing little display defects such as image sticking, dropping marks, and the like. In particular, the problem is solved by a liquid crystal composition containing, as a component, a compound having a polar group-containing biphenyl moiety.

Solution to Problem

As a result of research on various liquid crystal compounds and various chemical substances, the inventors of the present invention found that the problem can be solved by combining specified compounds, leading to the achievement of the present invention.

The present invention provides a nematic liquid crystal composition containing, as a first component, one or two or more compounds represented by general formula (I)

[Chem. 1]

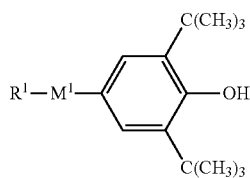
(I)

(in the formula, $R^1$ represents a linear alkyl group or branched alkyl group having 1 to 24 carbon atoms, one or two or more $CH_2$ groups in the alkyl group may be substituted by —O—, —CO—, —OCO—, or —COO— so that oxygen atoms are not directly adjacent to each other, and $M^1$ represents a trans-1,4-cyclohexylene group, a 1,4-phenylene group, or a single bond), and, as s second component, one or two or more compounds represented by general formula (II)

[Chem. 2]

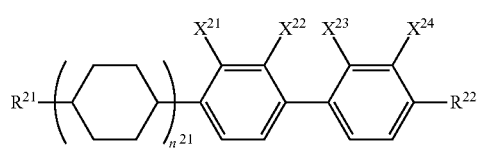
(II)

(in the formula, $R^{21}$ and $R^{22}$ each independently represent an alkyl group or alkoxy group having 1 to 10 carbon atoms or an alkenyl group having 2 to 10 carbon atoms, $X^{21}$ to $X^{24}$ each independently represent a hydrogen atom or a fluorine atom, and at least one of $X^{21}$ to $X^{24}$ represents a fluorine atom), wherein dielectric anisotropy ($\Delta\varepsilon$) is −2.0 or less, and further provides a liquid crystal display device using the liquid crystal composition.

Advantageous Effects of Invention

A liquid crystal composition having negative $\Delta\varepsilon$ according to the present invention can have significantly low viscosity and exhibits good solubility at a low temperature, and very small changes in resistivity and voltage holding ratio with heat and light, and thus has high practicability for products, and a VA-mode or PSVA-mode liquid crystal display device using the liquid crystal composition can achieve fast response and suppresses display defects, and is very useful.

DESCRIPTION OF EMBODIMENTS

In a liquid crystal composition of the present invention, in a compound used as a first component and represented by general formula (I),

[Chem. 3]

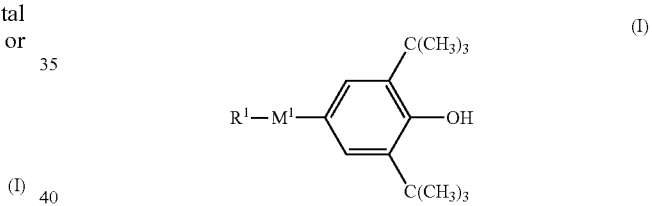
(I)

$R^1$ represents a linear alkyl group or branched alkyl group having 1 to 24 carbon atoms, one or two or more $CH_2$ groups in the alkyl group may be substituted by —O—, —CH=CH—, —CO—, —OCO—, —COO—, —C≡C—, —CF$_2$O—, or —OCF$_2$— so that oxygen atoms are not directly adjacent to each other, a linear alkyl group or linear alkoxy group having 1 to 10 carbon atoms, a linear alkyl group in which one $CH_2$ group is substituted by —OCO— or —COO—, a branched alkyl group, a branched alkoxy group, and a branched alkyl group in which one $CH_2$ group is substituted by —OCO— or —COO— are preferred, and a linear alkyl group having 1 to 24 carbon atoms, a linear alkyl group in which one $CH_2$ group is substituted by —OCO— or —COO—, a branched alkyl group, a branched alkoxy group, and a branched alkyl group in which one $CH_2$ group is substituted by —OCO— or —COO— are more preferred. $M^1$ represents a trans-1,4-cyclohexylene group, a 1,4-phenylene group, or a single bond, and a trans-1,4-cyclohexylene group or a 1,4-phenylene group is preferred.

More specifically, compounds represented by general formula (I-a) to general formula (I-d) below are preferred as the compound represented by the general formula (I).

[Chem. 4]

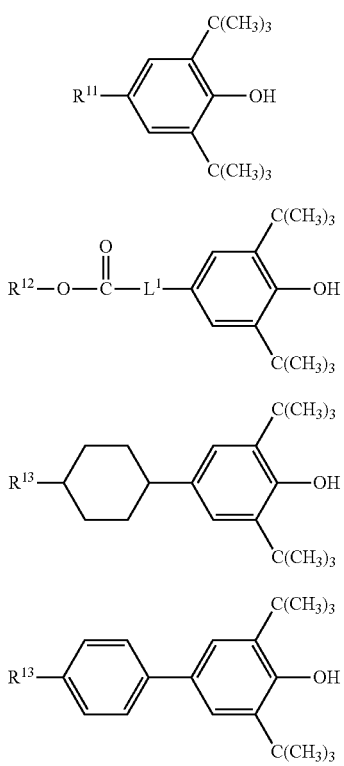

In the formulae, $R^{11}$ is preferably a linear alkyl group or branched alkyl group having 1 to 10 carbon atoms, $R^{12}$ is preferably a linear alkyl group or branched alkyl group having 1 to 20 carbon atoms, $R^{13}$ is preferably a linear alkyl group, branched alkyl group, linear alkoxy group, or branched alkoxy group having 1 to 8 carbon atoms, and $L^1$ is preferably a linear alkylene group or branched alkylene group having 1 to 8 carbon atoms. Among the compounds represented by the general formula (I-a) to the general formula (I-d), the compounds represented by the general formula (I-c) and the general formula (I-d) are more preferred.

The liquid crystal composition of the present invention preferably contains one or two compounds represented by the general formula (I) and more preferably one to five compounds, and the content thereof is preferably 0.001% to 1% by mass, more preferably 0.001% to 0.1% by mass, and particularly preferably 0.001% to 0.05% by mass.

In a compound used as a second component and represented by general formula (II),

[Chem. 5]

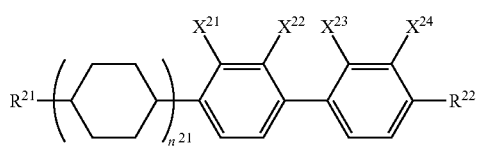

$R^{21}$ and $R^{22}$ each independently represent an alkyl group or alkoxy group having 1 to 10 carbon atoms, or an alkenyl group having 2 to 10 carbon atoms. $X^{21}$ to $X^{24}$ each independently represent a hydrogen atom or a fluorine atom, and at least one of $X^{21}$ to $X^{24}$ represents a fluorine atom.

More specifically, compounds represented by general formula (II-a) to general formula (II-f) below are preferred as the compound represented by the general formula (II).

[Chem. 6]

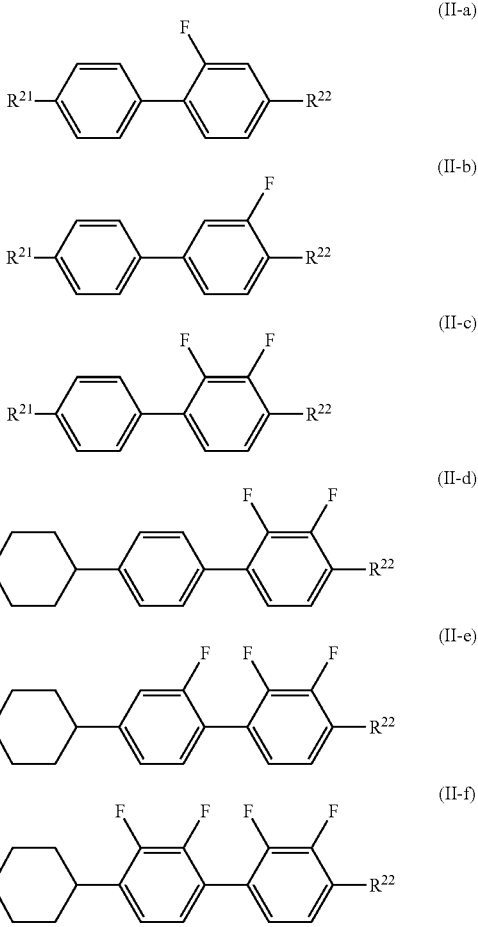

(In the formulae, $R^{21}$ and $R^{22}$ each independently represent an alkyl group or alkoxy group having 1 to 10 carbon atoms, or an alkenyl group having 2 to 10 carbon atoms.)

Among the compounds represented by general formula (II-a) to general formula (II-f), the compounds represented by general formula (II-a), general formula (II-c), and general formula (I-d) are more preferred.

The liquid crystal composition of the present invention contains at least one compound represented by the general formula (II), preferably contains one to ten compounds, and particularly preferably contains one to five compounds, and the content thereof is preferably 5% to 50% by mass and more preferably 5% to 40% by mass.

The liquid crystal composition of the present invention can further contain a compound selected from a compound group represented by general formula (III).

[Chem. 7]

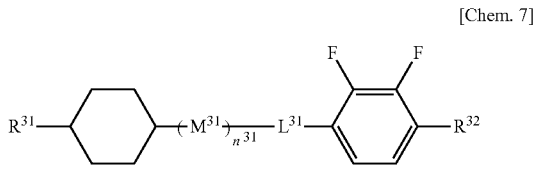

In a compound represented by the formula (III), $R^{31}$ and $R^{32}$ each independently represent an alkyl group or alkoxy group having 1 to 10 carbon atoms or an alkenyl group having 2 to 10 carbon atoms. $M^{31}$ represents a trans-1,4-cyclohexlene group. $L^{31}$ represents a single bond, —$CH_2CH_2$—, or —$CH_2O$—. $n^{31}$ represents 0 or 1.

The present invention can contain a compound represented by the general formula (III), preferably contains one to ten compounds, and particularly preferably one to eight compounds, and the content thereof is preferably 5% to 50% by mass and more preferably 5% to 30% by mass.

The liquid crystal composition of the present invention can further contain a compound selected from a compound group represented by general formula (IV-a) to general formula (IV-d).

[Chem. 8]

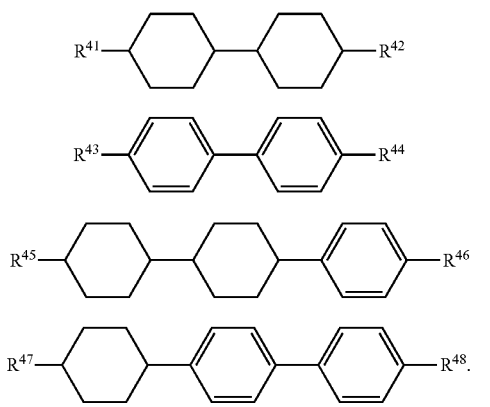

(In the formulae, $R^{41}$ to $R^{48}$ each independently represent an alkyl group or alkoxy alkyl group having 1 to 10 carbon atoms or an alkenyl group having 2 to 10 carbon atoms.)

The present invention can contain a compound selected from the compound group represented by the general formula (IV-a) to the general formula (IV-d), preferably contains one to ten compounds, and particularly preferably one to eight compounds, and the content thereof is preferably 5% to 80% by mass, more preferably 10% to 70% by mass, and particularly preferably 20% to 60% by mass.

The liquid crystal composition of the present invention preferably contains the compounds represented by the general formula (I), the general formula (II), the general formula (III), the general formula (IV-a) to the general formula (IV-d), and the general formula (V) at a total content of 90% to 100% by mass and more preferably 95% to 100% by mass.

The liquid crystal composition of the present invention preferably has a Δε at 25° C. of −2.0 to −6.0 and more preferably −2.5 to −5.5. In addition, Δn at 25° C. is preferably 0.08 to 0.14, more preferably 0.09 to 0.13, and particularly preferably 0.09 to 0.12. In further detail, in correspondence to a thin cell gap, Δn at 25° C. is preferably 0.10 to 0.13, while in correspondence to a thick cell gap, Δn at 25° C. is preferably 0.08 to 0.10. Further, η at 20° C. is preferably 10 to 30 mPa·s, more preferably 10 to 25 mPa·s, and particularly preferably 10 to 22 mPa·s, and $T_{ni}$ is preferably 60° C. to 120° C., more preferably 70° C. to 100° C., and particularly preferably 70° C. to 85° C.

Besides the above-described compounds, the liquid crystal composition of the present invention may further contain a usual nematic liquid crystal, smectic liquid crystal, cholesteric liquid crystal, or polymerizable monomer.

The liquid crystal composition of the present invention can contain a polymerizable compound for manufacturing a PS-mode, PSA-mode, or PSVA-mode liquid crystal display device. Examples of the polymerizable compound which can be used include photopolymerizable monomers subjected to polymerization which proceeds with energy rays such as light, and polymerizable compounds having as a structure a liquid crystal skeleton in which a plurality of six-member rings are connected to each other, for example, a biphenyl derivative, a terphenyl derivative, or the like. More specifically, a difunctional monomer represented by general formula (V) is preferred.

[Chem. 9]

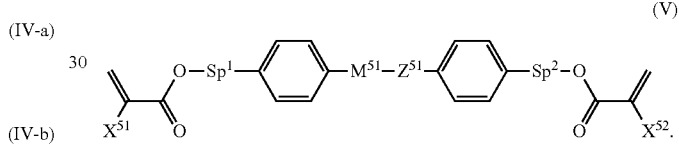

(V)

(In the formula, $X^{51}$ and $X^{52}$ each independently represent a hydrogen atom or a methyl group, $Sp^1$ and $Sp^2$ each independently represent a single bond, an alkylene group having 1 to 8 carbon atoms, or —O—$(CH_2)_s$— (wherein s represents an integer of 2 to 7, and an oxygen atom is bonded to an aromatic ring), $Z^{51}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (wherein $Y^1$ and $Y^2$ each independently represent a fluorine atom or a hydrogen atom), —C≡C—, or a single bond, $M^{51}$ represents a 1,4-phenylene group, a trans-1,4-cyclohexylene group, or a single bond, and any hydrogen atom of all 1,4-phenylene groups in the formula may be substituted by a fluorine atom.)

Either a diacrylate derivative in which $X^{51}$ and $X^{52}$ both represent hydrogen atoms or a dimethacrylate derivative in which $X^{51}$ and $X^{52}$ both represent methyl groups is preferred, and a compound in which one of $X^{51}$ and $X^{52}$ represents a hydrogen atom, and the other represents a methyl group is also preferred. Among these compounds, the diacrylate derivative has the highest polymerization rate, the dimethacrylate derivative has a lower polymerization rate, and an asymmetric compound has a medium polymerization rate between them. A preferred form can be used according to application. The dimethacrylate derivative is particularly preferred for a PSA display device.

$Sp^1$ and $Sp^2$ each independently represent a single bond, an alkylene group having 1 to 8 carbon atoms, or —O—

($CH_2$)$_s$—, but at least one of $Sp^1$ and $Sp^2$ is preferably a single bond for a PSA display device. Specifically, a compound in which $Sp^1$ and $Sp^2$ both represent single bonds or a form in which one represents a single bond, and the other represents an alkylene group having 1 to 8 carbon atoms, or —O—($CH_2$)$_s$— is preferred. In this case, a 1-4 alkyl group is preferred, and s is preferably 1 to 4.

$Z^{51}$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, and particularly preferably a single bond.

$M^{51}$ represents a 1,4-phenylene group in which a desired hydrogen atom may be substituted by a fluorine atom, a trans-1,4-cyclohexylene group, or a single bond, but a 1,4-phenylene group or a single bond is preferred. When C represents a ring structure other than a single bond, $Z^{51}$ is also preferably a linkage group other than a single bond, and when $M^{51}$ is a single bond, $Z^{51}$ is preferably a single bond.

In view of the above, specifically, a ring structure between $Sp^1$ and $Sp^2$ in the general formula (V) is preferably a structure described below.

In the general formula (V), when $M^{51}$ represents a single bond, and the ring structure includes two rings, the ring structure is preferably represented by formula (Va-1) to formula (Va-5), more preferably represented by formula (Va-1) to formula (Va-3), and particularly preferably represented by formula (Va-1).

[Chem. 10]

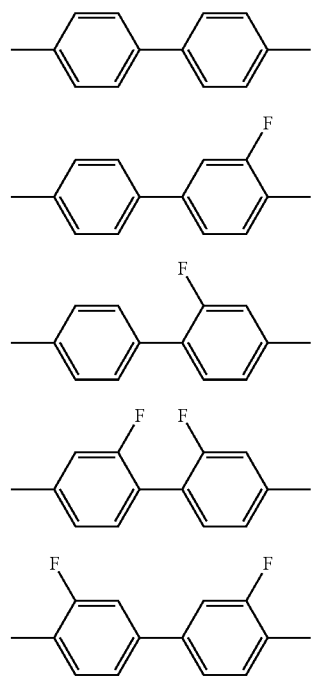

(in the formulae, each end is bonded to $Sp^1$ or $Sp^2$).

A polymerizable compound having such a skeleton has, after polymerization, alignment regulating force optimum for a PSA-mode liquid crystal display device, and thus a good alignment state can be achieved, thereby suppressing display unevenness or causing no display unevenness.

In view of the above, polymerizable monomers of general formula (V-1) to general formula (V-4) are particularly preferred, and general formula (V-2) is most preferred.

[Chem. 11]

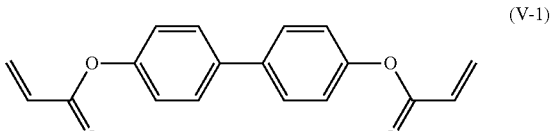

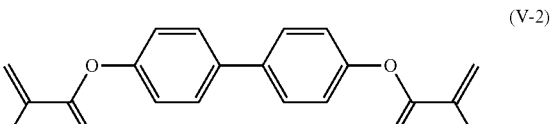

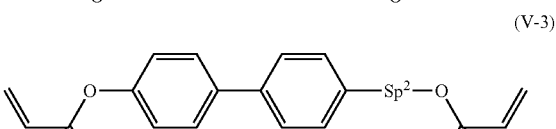

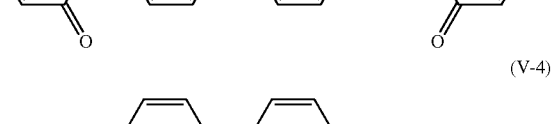

(In the formulae, $Sp^2$ represents an alkylene group having 2 to 5 carbon atoms.)

When the monomer is added to the liquid crystal composition of the present invention, polymerization proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like.

The liquid crystal composition containing the polymerizable compound of the present invention is imparted with a liquid crystal alignment ability when the polymerizable compound contained is polymerized by irradiation with ultraviolet light, and is used for a liquid crystal display device in which a quantity of light transmitted is controlled by using birefringence of the liquid crystal composition. The liquid crystal composition is useful for liquid crystal display devices, such as AM-LCD (active matrix liquid crystal display device), TN (nematic liquid crystal display device), STN-LCD (super twisted nematic liquid crystal display device), OCB-LCD, and IPS-LCD (in-plane switching liquid crystal display device) particularly useful for AM-LCD, and can be used for transmissive or reflective liquid crystal display devices.

Two substrates of a liquid crystal cell used in a liquid crystal display device can be formed by using a transparent material with flexibility, such as glass or plastic, and one of the two substrates may be made of an opaque material such as silicon or the like. A transparent substrate including a transparent electrode layer can be formed by sputtering indium tin oxide (ITO) on a transparent substrate such as a glass plate or the like.

A color filter can be formed by, for example, a pigment dispersion method, a printing method, an electrodeposition method, a dyeing method, or the like. The method for forming a color filter by the pigment dispersion method is described as an example. A curable colored composition for a color filter is applied on the transparent substrate, patterned, and then cured by heating or light irradiation. This process is performed for each of the three colors of red, green, and blue, thereby forming a pixel portion for a color filter. In addition, a pixel electrode provided with an active element such as TFT, a thin-film diode, a metal-insulator-metal resistivity element, or the like may be installed on the substrate.

The substrates are opposed to each other so that the transparent electrode layers face inward. In this case, the gap between the substrates may be adjusted through a spacer. The resulting light control layer is preferably adjusted to have a thickness of 1 to 100 µm. The thickness is more preferably 1.5 to 10 µm, and when a polarizing plate is used, the product of refractive index anisotropy Δn of a liquid crystal and cell thickness d is preferably adjusted to maximize contrast. When two polarizing plates are used, an angle of view and contrast can be improved by adjusting the polarizing axis of each of the polarizing plates. Further, a retardation film can be used for widening the angle of view. Examples of the spacer include glass particles, plastic particles, alumina particles, photoresist materials, and the like. Then, a sealing agent such as an epoxy-based curable composition or the like is screen-printed in a form having a liquid crystal inlet on each of the substrates, the substrates are bonded together, and then the sealing agent is thermally cured by heating.

A usual vacuum injection method or ODF method can be used as a method for holding the liquid crystal composition containing the polymerizable compound between the substrates, but the vacuum injection method has the problem of leaving injection marks, in spite of causing no dropping marks. However, the present invention can preferably use the ODF method in a process for manufacturing a liquid crystal display device.

Since an appropriate polymerization rate is desired for achieving good liquid crystal-aligning performance, a preferred method of polymerizing the polymerizable compound is a polymerization method in which the compound is polymerized by irradiation with one or combination of two or more of active energy rays such as ultraviolet light, electron beams, and the like, or by sequential irradiation with these active energy rays. When ultraviolet light is used, either a polarized light source or an unpolarized light source may be used. When the liquid crystal composition containing the polymerizable compound is polymerized in a state of being held between the two substrates, at least the substrate on the irradiation surface side must be imparted with transparency to the active energy rays. In addition, another method may be used, in which only a specified portion is polymerized by using a mask during light irradiation, and then the alignment state of an unpolymerized portion is changed by changing a condition such as an electric field, a magnetic field, or a temperature, followed by further polymerization by irradiation with active energy rays. In particular, ultraviolet exposure is preferably performed by applying an alternating-current electric field to the liquid crystal composition containing the polymerizable compound. The alternating-current electric field is preferably applied with an alternating current at a frequency of 10 Hz to 10 kHz, more preferably a frequency of 60 Hz to 10 kHz, and a voltage selected depending on a desired pre-tilt angle of the liquid crystal display device. That is, the pre-tilt angle of the liquid crystal display device can be controlled by the voltage applied. In a MVA-mode liquid crystal display device, the pre-tilt angle is preferably controlled to 80 degrees to 89.9 degrees from the viewpoint of alignment stability and contrast.

The temperature during irradiation preferably falls in a temperature range in which the liquid crystal state of the liquid crystal composition of the present invention can be maintained. Polymerization is preferably performed at a temperature close to room temperature, typically a temperature of 15° C. to 35° C. A metal halide lamp, a high-pressure mercury lamp, a superhigh-pressure mercury lamp, or the like can be used a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light is preferably 0.1 mW/cm$^2$ to 100 W/cm$^2$ and more preferably 2 mW/cm$^2$ to 50 W/cm$^2$. A quantity of irradiating ultraviolet light energy can be appropriately adjusted, but it is preferably 10 mJ/cm$^2$ to 500 J/cm$^2$, and more preferably 100 mJ/cm$^2$ to 200 J/cm$^2$. During ultraviolet irradiation, the intensity may be changed. The time required for ultraviolet irradiation is appropriately selected according to the intensity of irradiating ultraviolet light, but is preferably 10 seconds to 3600 seconds and more preferably 10 seconds to 600 seconds.

A liquid crystal display device using the liquid crystal composition of the present invention is useful, particularly useful for a liquid crystal display device for active matrix driving, because both fast response and suppression of display defects are achieved, and the liquid crystal display device can be applied to a liquid crystal display device for a VA mode, a PSVA mode, a PSA mode, an IPS mode, or an ECB mode.

EXAMPLES

The present invention is described in further detail below by way of examples, but the present invention is not limited to these examples. In the examples and comparative examples below, "%" in a composition represents "% by mass".

The characteristics measured in the examples are as follows.

$T_{ni}$: nematic-isotropic liquid phase transition temperature (° C.)

Δn: refractive index anisotropy at 20° C.

Δε: dielectric anisotropy at 20° C.

η: viscosity at 20° C. (mPa·s)

γ1: rotational viscosity at 20° C. (mPa·s)

VHR: voltage holding ratio (%) at 50° C. under the conditions of a frequency of 60 Hz and a voltage of 5 V applied Image Sticking:

Image sticking of a liquid crystal display device was evaluated by display of a predetermined fixed pattern within a display area for 1200 hours and then uniform display over the entire screen to visually observe the level of residual image of the fixed pattern based on the following 4 levels:

A: No residual image

B: Slight residual image at an allowable level

C: Residual image at an unallowable level

D: Significant residual image

Dropping Marks:

Dropping marks of a liquid crystal display device were evaluated by visually observing white dropping marks appearing on the surface of a full black display based on the following 4 levels:

A: No residual image

B: Slight residual image at an allowable level

C: Residual image at an unallowable level
D: Significant residual image

In the examples, compounds are described by using abbreviations below.

(Side Chain)
—n —$C_nH_{2n+1}$ linear alkyl group having n carbon atoms
n- $C_nH_{2n+1}$— linear alkyl group having n carbon atoms
—On —$OC_nH_{2n+1}$ linear alkoxy group having n carbon atoms
—V —CH=$CH_2$
V— $CH_2$=CH—
—V1 —CH=CH—$CH_3$
-2V1 —$CH_2$—$CH_2$—CH=CH—$CH_3$
V2- $CH_2$=CH—$CH_2$—$CH_2$—

(Ring Structure)

[Chem. 12]

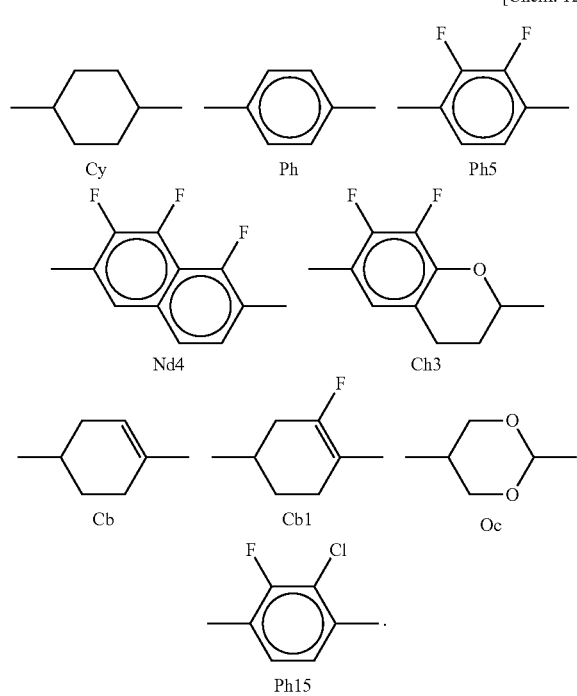

Example 1

Liquid crystal composition LC-1 shown below was prepared, and physical property values thereof were measured. The results are shown in a table below.

TABLE 1

|  | LC-1 |
| --- | --- |
| Tni/° C. | 78.1 |
| Δn | 0.087 |
| Δε | -3.2 |
| η/mPa·s | 17.8 |
| γ1/mPa·s | 114 |
| 3-CyCy-2 | 23 |
| 3-CyCy-V | 10 |
| 3-CyCy-4 | 10 |
| 3-CyPh5-O2 | 9 |
| 3-CyPh5-O4 | 8 |
| 3-CyCyPh5-O2 | 8 |
| 4-CyCyPh5-O2 | 10 |

TABLE 1-continued

|  | LC-1 |
| --- | --- |
| 2-CyPhPh5-O2 | 11 |
| 3-CyPhPh5-O2 | 11 |

Liquid crystal composition LCM-1 was prepared by adding 0.03% of a compound represented by formula (I-c-1) to 99.97% of the liquid crystal composition LC-1.

[Chem. 13]

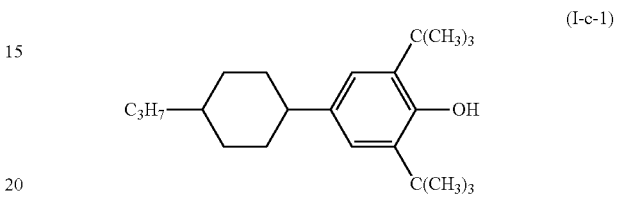

The physical property values thereof were substantially the same as LC-1. Initial VHR of the liquid crystal composition LCM-1 was 98.7% but after the composition was allowed to stand at a high temperature of 150° C. for 1 hour, VHR was 98.5%. A VA liquid crystal display device was formed by using the liquid crystal composition LCM-1, and image sticking and dropping marks were measured by the above-described methods. As a result, excellent results were exhibited as shown below.

TABLE 2

| Evaluation of dropping mark | A |
| --- | --- |
| Evaluation of image sticking | A |

Further, a response speed was measured by using a cell with ITO which had a cell gap of 3.5 μm and a polyimide alignment film applied thereto for inducing homeotropic alignment. As a result, a response speed of 4.6 msec was exhibited.

Comparative Example 1

The liquid crystal composition LC-1 to which the compound represented by the formula (I-c-1) described in Example 1 was not added showed an initial VHR of 98.5% but after the composition was allowed to stand at a high temperature of 150° C. for 1 hour, VHR was 86.7% and greatly decreased from the initial VHR.

Also, a VA liquid crystal display device was formed by using the liquid crystal composition LC-1, and image sticking and dropping marks were measured by the above-described methods. As a result, inferior results to Example 1 were exhibited as shown below.

TABLE 3

| Evaluation of dropping mark | C |
| --- | --- |
| Evaluation of image sticking | D |

Comparative Example 2

Liquid crystal composition LC-A shown below and not containing a compound represented by general formula (II) was prepared, and physical property values thereof were measured.

TABLE 4

| | LC-A |
|---|---|
| Tni/° C. | 77.8 |
| Δn | 0.084 |
| Δε | −3.27 |
| η/mPa · s | 20.3 |
| γ1/mPa · s | 130 |
| 3-CyCy-2 | 10 |

TABLE 4-continued

| | LC-A |
|---|---|
| 3-CyCy-V | 10 |
| 3-CyPh-1 | 8 |
| 3-CyCyPh-1 | 6 |
| V-CyCyPh-1 | 10 |
| 3-CyPh5-O2 | 8 |
| 3-CyPh5-O4 | 8 |
| 5-CyPh5-O4 | 11 |
| 3-CyCyPh5-O2 | 10 |
| 4-CyCyPh5-O2 | 10 |
| 5-CyCyPh5-O2 | 9 |

Liquid crystal composition LCM-2 was prepared by adding 0.03% of a compound represented by formula (I-c-1) to 99.97% of the liquid crystal composition LC-A. The physical property values thereof were substantially the same as LC-A. The liquid crystal composition LCM-2 not containing the compound represented by the general formula (II) showed increases in viscosity η and rotational viscosity γ1 as compared with the liquid crystal composition LCM-1 containing the compound represented by the general formula (II). Initial VHR of the liquid crystal composition LCM-2 was 98.3% but after the composition was allowed to stand at a high temperature of 150° C. for 1 hour, VHR was 95.9%. Also, a VA liquid crystal display device was formed by using the liquid crystal composition LCM-2, and image sticking and dropping marks were measured by the above-described methods. As a result, inferior results to Example 1 were exhibited as shown below.

TABLE 5

| Evaluation of dropping mark | C |
|---|---|
| Evaluation of image sticking | C |

In addition, a response speed was measured by using a cell with ITO which had a cell gap of 3.5 μm and a polyimide alignment film applied thereto for inducing homeotropic alignment. As a result, the response speed was 5.3 msec and inferior to LCM-1 described in Example 1.

Example 1 to Example 4

Liquid crystal compositions LC-2 to LC-4 shown below were prepared, and physical property values thereof were measured. The results are shown in a table below.

TABLE 6

| | LC-2 | | LC-3 | | LC-4 |
|---|---|---|---|---|---|
| Tni/° C. | 77.8 | Tni/° C. | 75.1 | Tni/° C. | 75.0 |
| Δn | 0.094 | Δn | 0.129 | Δn | 0.103 |
| Δε | −3.5 | Δε | −3.2 | Δε | −3.11 |
| η/mPa · s | 17.1 | η/mPa · s | 17.8 | η/mPa · s | 18.5 |
| γ1/mPa · s | 110 | γ1/mPa · s | 114 | γ1/mPa · s | 129 |
| 3-CyCy-2 | 23 | 3-CyCy-2 | 8 | 3-CyCy-2 | 25 |
| 3-CyCy-V | 10 | 3-CyPh-O4 | 10 | 3-CyCy-4 | 7 |
| 3-CyCy-4 | 10 | 3-CyCyPh-O2 | 6 | 3-CyPh-O1 | 8 |
| 3-CyPh5-O2 | 9 | 3-CyPh5-O2 | 10 | 3-CyCyPh-1 | 3 |
| 3-PhPh5-O2 | 8 | 5-CyPh5-O2 | 8 | 3-CyPh5-O2 | 9 |
| 3-CyCyPh5-O2 | 8 | 3-PhPh5-O2 | 10 | 3-PhPh5-O2 | 8 |
| 4-CyCyPh5-O2 | 10 | 3-CyCyPh5-O2 | 12 | 3-CyCyPh5-O2 | 8 |
| 2-CyPhPh5-O2 | 11 | 4-CyCyPh5-O2 | 8 | 4-CyCyPh5-O2 | 10 |
| 3-CyPhPh5-O2 | 11 | 2-CyCyPh5-1 | 5 | 2-CyPhPh5-O2 | 6 |
| | | 3-CyCyPh5-1 | 5 | 3-CyPhPh5-O2 | 10 |
| | | 3-PhPh5Ph-1 | 10 | 3-PhPh5Ph-2 | 6 |
| | | 4-PhPh5Ph-2 | 8 | | |

Liquid crystal compositions LCM-3 to LCM-5 were prepared by adding 0.03% of a compound represented by formula (I-c-1) to 99.97% of the liquid crystal compositions LC-2 to LC-4, respectively. The physical property values thereof were substantially the same as before the addition of the compound. VHR after each of the liquid crystal compositions LCM-3 to LCM-5 was allowed to stand at a high temperature of 150° C. for 1 hour was substantially the same as initial VHR. A VA liquid crystal display device was formed by using each of the liquid crystal compositions LCM-3 to LCM-5, and image sticking and dropping marks were measured. As a result, excellent results were exhibited as shown below.

TABLE 7

| | LCM-3 | LCM-4 | LCM-5 |
|---|---|---|---|
| Initial VHR (%) | 98.5 | 98.2 | 98.3 |
| VHR (%) after 1 hour at 150° C. | 98.1 | 98.0 | 98.1 |
| Evaluation of dropping mark | A | A | A |
| Evaluation of image sticking | A | A | A |

Example 5

Liquid crystal composition LC-5 shown below was prepared, and physical property values thereof were measured. The results are shown in a table below.

TABLE 8

| | LC-5 |
|---|---|
| Tni/° C. | 73.1 |
| Δn | 0.103 |
| Δε | −3.12 |
| η/mPa · s | 17.5 |

TABLE 8-continued

| | LC-5 |
|---|---|
| γ1/mPa · s | 121 |
| 3-CyCy-2 | 25 |
| 3-CyCy-V | 7 |
| 3-CyPh-O1 | 8 |
| 3-CyCyPh-1 | 3 |
| 3-CyPh5-O2 | 9 |
| 3-PhPh5-O2 | 8 |
| 3-CyCyPh5-O2 | 8 |
| 4-CyCyPh5-O2 | 10 |
| 2-CyPhPh5-O2 | 6 |
| 3-CyPhPh5-O2 | 10 |
| 3-PhPh5Ph-2 | 6 |

Liquid crystal composition LCM-6 was prepared by adding 0.03% of a compound represented by formula (I-c-1) to 99.97% of the liquid crystal composition LC-5. The physical property values thereof were substantially the same as before the addition of the compound. VHR after the liquid crystal composition LCM-6 was allowed to stand at a high temperature of 150° C. for 1 hour was substantially the same as initial VHR. A VA liquid crystal display device was formed by using the liquid crystal composition LCM-6, and image sticking and dropping marks were measured. As a result, excellent results were exhibited as shown below.

TABLE 9

| | LCM-6 |
|---|---|
| Initial VHR (%) | 98.2 |
| VHR (%) after 1 hour at 150° C. | 98.1 |
| Evaluation of dropping mark | A |
| Evaluation of image sticking | A |

Example 6 and Example 7

Liquid crystal compositions LCM-7 and LCM-8 were prepared by adding 0.03% of a compound represented by formula (I-a-1) to 99.97% of the liquid crystal composition LC-1 described in Example 1 and LC-5 described in Example 5, respectively.

[Chem. 14]

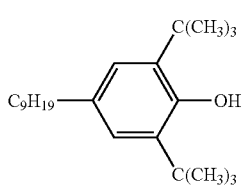

(I-a-1)

The physical property values thereof were substantially the same as before the addition of the compound. VHR after each of the liquid crystal compositions LCM-7 and LCM-8 was allowed to stand at a high temperature of 150° C. for 1 hour was substantially the same as initial VHR. A VA liquid crystal display device was formed by using each of the liquid crystal compositions LCM-7 and LCM-8, and image sticking and dropping marks were measured. As a result, excellent results were exhibited as shown below.

TABLE 10

| | LCM-7 | LCM-8 |
|---|---|---|
| Initial VHR (%) | 98.2 | 98.4 |
| VHR (%) after 1 hour at 150° C. | 98.0 | 98.1 |
| Evaluation of dropping mark | A | A |
| Evaluation of image sticking | A | A |

Example 8

Liquid crystal composition LCM-9 was prepared by adding 0.03% of a compound represented by formula (I-b-1) to 99.97% of the liquid crystal composition LC-1 described in Example 1.

[Chem. 15]

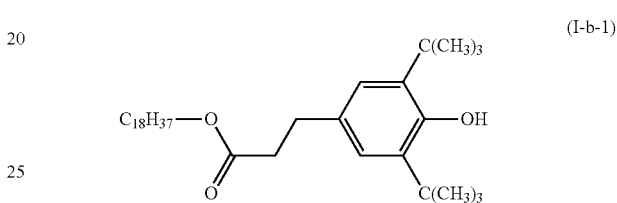

(I-b-1)

The physical property values thereof were substantially the same as before the addition of the compound. VHR after the liquid crystal composition LCM-9 was allowed to stand at a high temperature of 150° C. for 1 hour was substantially the same as initial VHR. Also, a VA liquid crystal display device was formed by using the liquid crystal composition LCM-9, and image sticking and dropping marks were measured. As a result, excellent results were exhibited as shown below.

TABLE 11

| | LCM-9 |
|---|---|
| Initial VHR (%) | 98.6 |
| VHR (%) after 1 hour at 150° C. | 98.3 |
| Evaluation of dropping mark | A |
| Evaluation of image sticking | A |

Example 9

Polymerizable liquid crystal composition CLCM-1 was prepared by adding, to 99.7% of the liquid crystal composition LCM-1 described in Example 1, 0.3% of a polymerizable compound represented by

[Chem. 16]

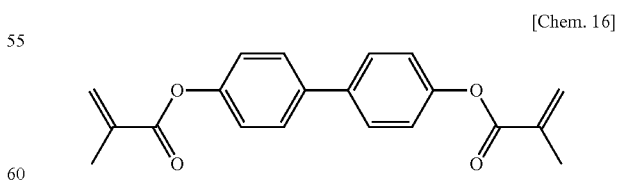

and uniformly dissolving the compound, and the polymerizable liquid crystal composition was injected, by a vacuum injection method, into a cell with ITO having a cell gap of 3.5 μm and a polyimide alignment film applied thereto for inducing homeotropic alignment. After the injection, the polymerizable compound in the polymerizable liquid crystal composition was polymerized by light irradiation for 600 seconds using a high-pressure mercury lamp having a peak wavelength of 300 to 400 nm with a voltage applied so that the irradiation intensity on a cell surface was 10 mW/cm$^2$, thereby producing a vertical alignment liquid crystal display device. As a result of measurement of image sticking and dropping marks of the liquid crystal display device, excellent results were exhibited as shown below.

TABLE 12

| Evaluation of dropping mark | A |
|---|---|
| Evaluation of image sticking | A |

Comparative Example 3 and Comparative Example 4

Polymerizable liquid crystal compositions CLCM-2 and CLCM-3 were prepared by adding, to 99.7% of the liquid crystal composition LC-1 used in Comparative Example 1 and the liquid crystal composition LCM-2 used in Comparative Example 2, respectively, 0.3% of a polymerizable compound represented by

[Chem. 17]

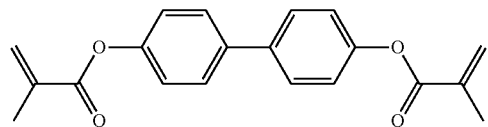

and uniformly dissolving the compound, and each of the polymerizable liquid crystal compositions was injected, by a vacuum injection method, into a cell with ITO having a cell gap of 3.5 μm and a polyimide alignment film applied thereto for inducing homeotropic alignment. After the injection, the polymerizable compound in the polymerizable liquid crystal composition was polymerized by light irradiation for 600 seconds with a high-pressure mercury lamp having a peak wavelength of 300 to 400 nm with a voltage applied so that the irradiation intensity on a cell surface was 10 mW/cm$^2$, thereby producing a vertical alignment liquid crystal display device.

As a result of measurement of image sticking and dropping marks of the liquid crystal display devices, inferior results to Example 9 were exhibited as shown below.

TABLE 13

|  | Device formed using CLCM-2 | Device formed using CLCM-3 |
|---|---|---|
| Evaluation of dropping mark | D | D |
| Evaluation of image sticking | D | C |

Example 10 to Example 13

Polymerizable liquid crystal compositions CLCM-4, CLCM-5, and CLCM-6 were prepared by adding, to 99.7% of the liquid crystal compositions LCM-3 to 5 described in Examples 2 to 4, respectively, 0.3% of a polymerizable compound represented by

[Chem. 18]

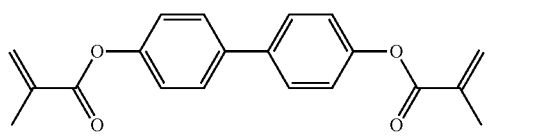

and uniformly dissolving the compound, and each of the polymerizable liquid crystal compositions was injected, by a vacuum injection method, into a cell with ITO having a cell gap of 3.5 μm and a polyimide alignment film applied thereto for inducing homeotropic alignment. After the injection, the polymerizable compound in the polymerizable liquid crystal composition was polymerized by light irradiation for 600 seconds using a high-pressure mercury lamp having a peak wavelength of 300 to 400 nm with a voltage applied so that the irradiation intensity on a cell surface was 10 mW/cm$^2$, thereby producing a vertical alignment liquid crystal display device.

TABLE 14

|  | Device formed using CLCM-4 | Device formed using CLCM-5 | Device formed using CLCM-6 |
|---|---|---|---|
| Evaluation of dropping mark | A | A | A |
| Evaluation of image sticking | A | A | A |

As a result of measurement of image sticking and dropping marks of the liquid crystal display devices, excellent results were exhibited as shown above.

Example 14 to Example 4

Liquid crystal compositions LC-6 to LC-29 shown below were prepared, and physical property values thereof were measured. The results are shown in tables below.

TABLE 15

|  | LC-6 | LC-7 | LC-8 | LC-9 | LC-10 | LC-11 | LC-12 |
|---|---|---|---|---|---|---|---|
| Tni | 87.3 | 89.3 | 83.2 | 70.2 | 71.9 | 73.3 | 71.7 |
| Δn | 0.163 | 0.163 | 0.158 | 0.155 | 0.157 | 0.157 | 0.156 |
| Δε | −6.4 | −5.97 | −5.92 | −5.57 | −6.47 | −6.49 | −6.3 |
| η/mPa·s | 32.8 | 35.6 | 31.7 | 24.8 | 24 | 24.2 | 23.1 |
| γ1/mPa·s | 256 | 320 | 267 | 169 | 184 | 195 | 191 |
| 3-CyCy-2 |  |  | 11 |  |  |  |  |
| 3-CyCy-V1 | 11 | 11 |  | 12 | 12 | 12 | 6 |
| V-CyCy-V1 |  |  |  |  |  |  | 6 |

TABLE 15-continued

|  | LC-6 | LC-7 | LC-8 | LC-9 | LC-10 | LC-11 | LC-12 |
|---|---|---|---|---|---|---|---|
| 5-PhPh-1 |  |  |  | 7 |  |  |  |
| 1-PhPh-2V1 |  |  |  |  | 7 | 7 | 7 |
| V-CyCyPh-1 |  |  |  | 10 |  |  |  |
| V2-CyCyPh-1 |  |  |  |  | 10 | 10 | 10 |
| V-CyPhPh-3 |  |  |  | 10 | 10 |  |  |
| 3-CyPhPh-2 |  |  |  |  |  |  | 10 |
| 5-CyPhPh-2 |  |  |  |  |  | 10 |  |
| 3-PhPh5-O2 |  | 17 |  | 18 | 18 | 18 | 16 |
| 3-PhPh5-O4 |  | 16 |  | 16 |  |  |  |
| 5-PhPh5-O2 |  |  | 16 | 18 | 18 | 18 | 20 |
| 5-PhPh5-O4 |  |  | 17 | 17 |  |  |  |
| 3-CyCyPh5-O2 |  |  | 12 | 10 |  |  |  |
| 3-CyCyPh5-O3 |  | 12 |  |  |  |  |  |
| 4-CyCyPh5-O2 |  | 10 | 10 | 12 |  |  |  |
| 2-CyPhPh5-O2 |  |  |  |  | 12 | 13 | 13 | 10 |
| 3-CyPhPh5-O2 |  |  |  |  | 13 | 12 | 12 | 15 |
| 3-PhPh5Ph-2 |  | 10 | 10 | 14 |  |  |  |
| 4-PhPh5Ph-2 |  | 14 | 14 | 10 |  |  |  |
| 3-CyPhPh5Ph-2 |  |  | 5 | 5 |  |  |  |
| 5-CyPhPh5Ph-2 |  | 10 | 5 | 5 |  |  |  |

TABLE 16

|  | LC-13 | LC-14 | LC-15 | LC-16 |
|---|---|---|---|---|
| Tni | 75 | 74 | 75 | 75.6 |
| Δn | 0.103 | 0.105 | 0.103 | 0.105 |
| Δε | −3.09 | −3.28 | −3.11 | −3.16 |
| η/mPa · s | 19.8 | 18.1 | 18.5 | 18.3 |
| γ1/mPa · s | 138 | 118 | 129 | 129 |
| 3-CyCy-2 | 23 | 21 | 25 | 25 |
| 3-CyCy-4 |  |  | 7 |  |
| 3-CyCy-5 | 9 |  |  |  |
| 2-CyCy-V1 |  | 11 |  |  |
| 3-CyCy-V1 |  |  |  | 7 |
| 3-CyPh-O1 | 8 |  | 8 | 8 |
| 3-CyPh-O4 |  | 8 |  |  |
| 3-CyCyPh-1 |  | 3 | 3 | 3 |
| 3-CyCyPh-3 | 3 |  |  |  |
| 3-CyPh5-O2 | 8 | 9 | 9 | 9 |
| 3-PhPh5-O2 | 9 | 8 | 8 | 8 |
| 3-CyCyPh5-O2 | 9 | 9 | 8 | 8 |
| 4-CyCyPh5-O2 | 9 | 9 | 10 | 10 |
| 2-CyPhPh5-O2 | 8 | 8 | 6 | 6 |
| 3-CyPhPh5-O2 | 8 | 8 | 10 | 10 |
| 3-PhPh5Ph-2 |  | 6 | 6 | 6 |
| 4-PhPh5Ph-2 | 6 |  |  |  |

TABLE 17

|  | LC-17 | LC-18 | LC-19 | LC-20 | LC-21 | LC-22 |
|---|---|---|---|---|---|---|
| Tni | 80.8 | 77.1 | 79.5 | 79.7 | 90.6 | 72.3 |
| Δn | 0.112 | 0.108 | 0.109 | 0.104 | 0.108 | 0.084 |
| Δε | −3.17 | −3.15 | −3.1 | −3.45 | −5.51 | −3.72 |
| η/mPa · s | 17.7 | 16.7 | 16.5 | 16.9 | 40 | 16.6 |
| γ1/mPa · s | 118 | 104 | 112 | 107 | 235 | 89 |
| 3-CyCy-2 |  |  |  | 4 |  |  |
| 3-CyCy-V | 30 | 39 | 35 | 32 | 10 | 38 |
| 3-CyCy-V1 | 9 |  | 4 | 3 | 3 |  |
| 3-CyPh5-O2 | 10 | 16 | 10 | 16 | 14 | 20 |
| 3-CyPh5-O4 | 6 |  | 6 |  |  |  |
| 5-CyPh5-O2 |  |  |  |  | 12 | 4 |
| 2-CyPhPh5-1 |  |  |  |  | 10 |  |
| 2-CyPhPh5-O2 |  |  |  | 6 | 10 |  |
| 3-CyPhPh5-O2 | 11 | 9 | 11 | 11 | 10 | 11 |
| 3-CyPhPh5-O3 | 6 | 8 | 6 |  |  | 13 |
| 4-CyPhPh5-O2 |  |  |  |  | 10 | 9 |
| 5-CyPhPh5-O2 |  |  |  |  | 10 |  |
| 2-CyPhPh5-O2 | 7 | 7 |  | 7 |  |  |
| 3-CyPhPh5-O2 | 7 | 7 | 7 | 7 |  |  |
| 3-CyPhPh5-O4 |  |  | 7 | 7 |  | 4 |
| 3-PhPh5Ph-1 |  |  |  | 4 |  |  |
| 3-PhPh5Ph-2 | 14 | 7 | 10 | 7 | 3 |  |
| 3-PhPh5Ph-3 |  |  |  |  |  |  |
| 4-PhPh5Ph-2 |  | 7 | 4 |  | 4 | 5 |

TABLE 18

|  | LC-23 | LC-24 | LC-25 | LC-26 |
|---|---|---|---|---|
| Tni | 87.7 | 81.5 | 81.8 | 81.8 |
| Δn | 0.079 | 0.094 | 0.087 | 0.081 |
| Δε | −3.58 | −3.39 | −3.11 | −3.1 |
| η/mPa · s | 31.6 | 19.4 | 20.2 | 21.3 |
| γ1/mPa · s | 188 | 128 | 131 | 139 |
| 3-CyCy-2 | 5 | 23 | 23 | 23 |
| 3-CyCy-4 | 10 | 10 | 10 |  |
| 3-CyCy-5 |  | 10 | 10 |  |
| 3-CyCy-O1 | 5 |  |  |  |
| 3-CyCy-O3 | 6 |  |  |  |
| 5-CyCy-O1 | 5 |  |  |  |
| 3-CyPh-O1 |  |  |  | 8 |
| 3-CyCyPh-1 |  |  |  | 12 |
| 3-CyPh5-O2 | 9 | 9 | 10 | 9 |
| 3-CyPh5-O4 |  |  | 7 | 8 |
| 5-CyPh5-O2 | 9 |  |  |  |
| 5-CyPh5-O4 |  |  |  | 5 |
| 3-PhPh5-O2 |  | 8 |  |  |
| 3-CyCyPh5-1 | 25 |  |  |  |
| 3-CyCyPh5-O2 | 12 | 8 | 8 | 13 |
| 4-CyCyPh5-O2 |  | 10 | 10 | 13 |
| 5-CyCyPh5-O2 | 14 |  |  | 9 |
| 2-CyPhPh5-O2 |  | 11 | 11 |  |
| 3-CyPhPh5-O2 |  | 11 | 11 |  |

TABLE 19

|  | LC-27 | LC-28 | LC-29 |
|---|---|---|---|
| Tni | 81.4 | 81.7 | 81.4 |
| Δn | 0.096 | 0.089 | 0.086 |
| Δε | −3.56 | −3.27 | −3.33 |
| η/mPa · s | 18.2 | 18.9 | 21.6 |
| γ1/mPa · s | 121 | 125 | 142 |
| 3-CyCy-2 | 23 | 23 | 10 |
| 3-CyCy-4 | 10 | 10 |  |
| 3-CyCy-V1 | 10 | 10 | 10 |
| 3-CyPh-O1 |  |  | 8 |

TABLE 19-continued

|  | LC-27 | LC-28 | LC-29 |
|---|---|---|---|
| 3-CyCyPh-1 |  |  | 6 |
| V-CyCyPh-1 |  |  | 10 |
| 3-CyPh5-O2 | 9 | 9 | 8 |
| 3-CyPh5-O4 |  | 8 | 8 |
| 5-CyPh5-O4 |  |  | 11 |
| 3-PhPh5-O2 | 8 |  |  |
| 3-CyCyPh5-O2 | 8 | 8 | 10 |
| 4-CyCyPh5-O2 | 10 | 10 | 10 |
| 5-CyCyPh5-O2 |  |  | 9 |
| 2-CyPhPh5-O2 | 11 | 11 |  |
| 3-CyPhPh5-O2 | 11 | 11 |  |

Liquid crystal compositions LCM-7 to LCM-30 were prepared by adding 0.03% of a compound represented by formula (I-c-1) to 99.97% of the liquid crystal compositions LC-6 to 29, respectively.

[Chem. 19]

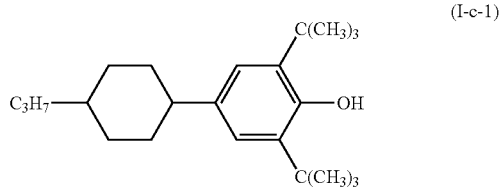

(I-c-1)

As in Example 1, the physical property values thereof were substantially the same as those before the addition of the compound represented by formula (I-c-1).

Also, as a result of measurement of physical property values described below of the liquid crystal compositions LCM-7 to LCM-30, excellent results were exhibited.

TABLE 20

|  | LCM-7 | LCM-8 | LCM-9 | LCM-10 | LCM-11 | LCM-12 | LCM-13 |
|---|---|---|---|---|---|---|---|
| Initial VHR (%) | 98. | 98. | 98. | 98. | 98. | 98. | 98. |
| VHR (%) after 1 hour at 150° C. | 98. | 98. | 98. | 98. | 98. | 98. | 98. |
| Evaluation of dropping mark | A | A | A | A | A | A | A |
| Evaluation of image sticking | A | A | A | A | A | A | A |

TABLE 21

|  | LCM-14 | LCM-15 | LCM-16 | LCM-17 |
|---|---|---|---|---|
| Initial VHR (%) | 98.4 | 98.6 | 98.6 | 98.5 |
| VHR (%) after 1 hour at 150° C. | 98.2 | 98.3 | 98.2 | 98.3 |
| Evaluation of dropping mark | A | A | A | A |
| Evaluation of image sticking | A | A | A | A |

TABLE 22

|  | LCM-18 | LCM-19 | LCM-20 | LCM-21 | LCM-22 | LCM-23 |
|---|---|---|---|---|---|---|
| Initial VHR (%) | 98.3 | 98.4 | 98.5 | 98.4 | 98.6 | 98.4 |
| VHR (%) after 1 hour at 150° C. | 98.0 | 98.2 | 98.1 | 98.1 | 98.3 | 98.0 |
| Evaluation of dropping mark | A | A | A | A | A | A |
| Evaluation of image sticking | A | A | A | A | A | A |

TABLE 23

|  | LCM-24 | LCM-25 | LCM-26 | LCM-27 |
|---|---|---|---|---|
| Initial VHR (%) | 98.4 | 98.3 | 98.6 | 98.5 |
| VHR (%) after 1 hour at 150° C. | 98.1 | 98.1 | 98.3 | 98.2 |
| Evaluation of dropping mark | A | A | A | A |
| Evaluation of image sticking | A | A | A | A |

TABLE 24

|  | LCM-28 | LCM-29 | LCM-30 |
|---|---|---|---|
| Initial VHR (%) | 98.4 | 98.3 | 98.5 |
| VHR (%) after 1 hour at 150° C. | 98.1 | 98.0 | 98.1 |
| Evaluation of dropping mark | A | A | A |
| Evaluation of image sticking | A | A | A |

The invention claimed is:

1. A nematic liquid crystal composition comprising, as a first component, at least one compound represented by general formula (I)

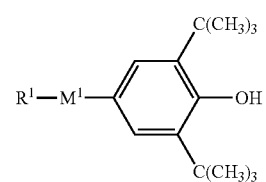

(I)

in the formula, $R^1$ represents a linear alkyl group or branched alkyl group having 1 to 24 carbon atoms, one or two or more $CH_2$ groups in the alkyl group may be substituted by —O—, —CO—, —OCO—, or —COO— so that oxygen atoms are not directly adjacent to each other, and $M^1$ represents a single bond, and, as s second component, at least one compound represented by general formula (II)

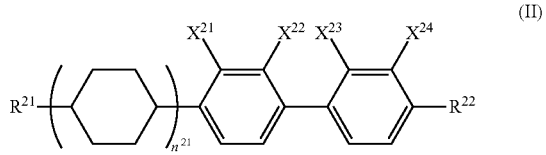

(II)

in the formula, $R^{21}$ and $R^{22}$ each independently represent an alkyl group or alkoxy group having 1 to 10 carbon atoms or an alkenyl group having 2 to 10 carbon atoms, $n^{21}$ represents 0 or 1, $X^{21}$ to $X^{24}$ each independently represent a hydrogen atom or a fluorine atom, and at least one of $X^{21}$ to $X^{24}$ represents a fluorine atom, wherein dielectric anisotropy (Δε) at 25° C. is −2.0 or less.

2. The nematic liquid crystal composition according to claim 1, comprising, as a third component, one or two or more compounds represented by general formula (III),

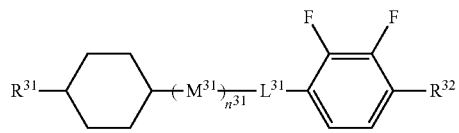

(III)

in the formula, $R^{31}$ and $R^{32}$ each independently represent an alkyl group or alkoxy group having 1 to 10 carbon atoms or an alkenyl group having 2 to 10 carbon atoms, $M^{31}$ represents a trans-1,4-cyclohexylene group, one or two —CH$_2$— in the trans-1,4-cyclohexylene group may be substituted by —O— so that oxygen atoms are not directly adjacent to each other, one or two hydrogen atoms in the phenylene group may be substituted by a fluorine atom, $L^{31}$ represents a single bond, —CH$_2$CH$_2$—, or —CH$_2$O—, and $n^{31}$ represents 0 or 1.

3. The liquid crystal composition according to claim 1, comprising a compound selected from a compound group represented by general formula (IV-a) to general formula (IV-d),

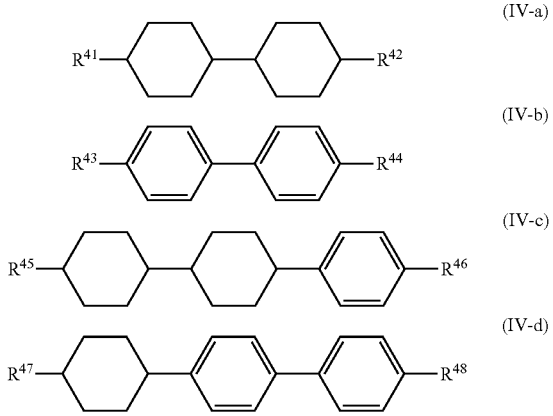

in the formulae, $R^{41}$ to $R^{48}$ each independently represent an alkyl group or alkoxy group having 1 to 10 carbon atoms or an alkenyl group having 2 to 10 carbon atoms.

4. The nematic liquid crystal composition according to claim 1, wherein in the general formula (I), $R^1$ represents a linear alkyl group or branched alkyl group having 1 to 10 carbon atoms.

5. The nematic liquid crystal composition according to claim 1, wherein the content of the compound represented by the general formula (I) is 0.001% by mass to 1% by mass, and the content of the compound represented by the general formula (II) is 5% by mass to 30% by mass.

6. The nematic liquid crystal composition according to claim 1, comprising a polymerizable compound represented by general formula (V),

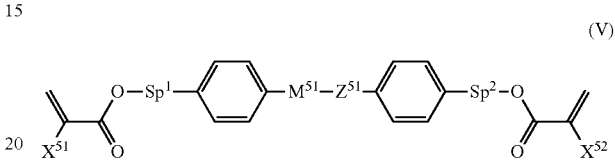

(V)

in the formula, $X^{51}$ and $X^{52}$ each independently represent a hydrogen atom or a methyl group, Sp$^1$ and Sp$^2$ each independently represent a single bond, an alkylene group having 1 to 8 carbon atoms, or —O—(CH$_2$)$_s$— wherein s represents an integer of 2 to 7, and an oxygen atom is bonded to an aromatic ring, $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— wherein Y$^1$ and Y$^2$ each independently represent a fluorine atom or a hydrogen atom, —C≡C—, or a single bond, $M^{51}$ represents a 1,4-phenylene group, a trans-1,4-cyclohexylene group, or a single bond, and any hydrogen atom of all 1,4-phenylene groups in the formula may be substituted by a fluorine atom.

7. A liquid crystal display device comprising a first substrate provided with a common electrode composed of a transparent conductive material, a second substrate provided with a pixel electrode that is composed of a transparent conductive material and a thin film transistor that controls the pixel electrode provided for each pixel, and a liquid crystal composition held between the first substrate and the second substrate, wherein alignment of liquid crystal molecules in the liquid crystal composition with no voltage applied is substantially vertical to the substrates, and the nematic liquid crystal composition according to claim 1 is used as the liquid crystal composition.

8. A polymer stabilized-mode liquid crystal display device produced by polymerizing a polymerizable compound contained in a liquid crystal composition with or without a voltage applied, wherein the nematic liquid crystal composition containing the polymerizable compound according to claim 6 is used as the liquid crystal composition.

* * * * *